(12) United States Patent
Ning et al.

(10) Patent No.: US 12,107,226 B2
(45) Date of Patent: *Oct. 1, 2024

(54) ELECTROLYTE FOR POWER STORAGE DEVICES AND NONAQUEOUS ELECTROLYTE SOLUTION

(71) Applicant: TOMIYAMA PURE CHEMICAL INDUSTRIES, LTD., Tokyo (JP)

(72) Inventors: Tailu Ning, Kamisu (JP); Kazuyuki Shimizu, Kamisu (JP); Hiroo Nitta, Kamisu (JP)

(73) Assignee: TOMIYAMA PURE CHEMICAL INDUSTRIES, LTD., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 18/381,688

(22) Filed: Oct. 19, 2023

(65) Prior Publication Data

US 2024/0088444 A1    Mar. 14, 2024

Related U.S. Application Data

(63) Continuation of application No. 16/981,798, filed as application No. PCT/JP2018/011832 on Mar. 23, 2018, now Pat. No. 11,830,982.

(51) Int. Cl.

| | |
|---|---|
| H01M 10/0568 | (2010.01) |
| C01B 33/32 | (2006.01) |
| C01B 35/10 | (2006.01) |
| C01B 35/14 | (2006.01) |
| H01G 11/60 | (2013.01) |
| H01G 11/62 | (2013.01) |
| H01G 11/64 | (2013.01) |
| H01M 10/0525 | (2010.01) |
| H01M 10/0567 | (2010.01) |
| H01M 10/0569 | (2010.01) |

(52) U.S. Cl.
CPC ......... *H01M 10/0568* (2013.01); *C01B 33/32* (2013.01); *C01B 35/1027* (2013.01); *C01B 35/14* (2013.01); *C01B 35/146* (2013.01); *H01G 11/60* (2013.01); *H01G 11/62* (2013.01); *H01G 11/64* (2013.01); *H01M 10/0525* (2013.01); *H01M 10/0567* (2013.01); *H01M 10/0569* (2013.01); *C01P 2006/40* (2013.01); *H01M 2300/004* (2013.01)

(58) Field of Classification Search
None
See application file for complete search history.

(56) References Cited

U.S. PATENT DOCUMENTS

| | | | |
|---|---|---|---|
| 2003/0108800 A1 | 6/2003 | Barbarich | |
| 2016/0240880 A1* | 8/2016 | Keshavarz | H01M 8/20 |
| 2016/0240888 A1 | 8/2016 | Hamasaki et al. | |
| 2016/0254520 A1 | 9/2016 | Okuda et al. | |

FOREIGN PATENT DOCUMENTS

| | | |
|---|---|---|
| JP | 4-184872 A | 7/1992 |
| JP | 10-27625 A | 1/1998 |
| JP | H11-219722 A | 8/1999 |
| JP | 11-329494 A | 11/1999 |
| JP | 2003068361 A | 3/2003 |
| JP | 2005536832 A | 12/2005 |
| JP | 2014022334 A | 2/2014 |
| JP | 2015092471 A | 5/2015 |
| JP | 2015232923 A | 12/2015 |
| KR | 20160079033 A | 7/2016 |

OTHER PUBLICATIONS

International Preliminary Report on Patentability and Written Opinion issued Sep. 29, 2020 in PCT/JP2018/011832 (English translation only).
International Search Report issued May 15, 2018 in PCT/JP2018/011832 (with English translation), 5 pages.

* cited by examiner

*Primary Examiner* — Wyatt P McConnell
(74) *Attorney, Agent, or Firm* — Element IP, PLC

(57) ABSTRACT

To provide an electrolyte for a storage device capable of lowering the electric resistance and maintaining a high capacity even after charging and discharging are repeatedly carried out, and a storage device.

An electrolyte for a storage device, which comprises a lithium-containing complex compound represented by the following formula (1), (2), (3), (4) or (5):

$$(Li)_m(A)_n(UF_x)_y \quad (1)$$

$$(Li)_m(Si)_n(O)_q(UF_x)_y \quad (2)$$

wherein A is O, S, P or N; U is a boron atom or a phosphorus atom; m and n are each independently from 1 to 6; q is from 1 to 12; x is 3 or 5; and y is from 1 to 6;

$$(Li)_m(O)_n(B)_p(OWF_q)_x \quad (3)$$

wherein W is a boron atom or a phosphorus atom; m, p and x are each independently from 1 to 15; n is from 0 to 15; and q is 3 or 5;

$$(Li)_m(B)_p(O)n(OR)_y(OWF_q)_x \quad (4)$$

wherein W is a boron atom or a phosphorus atom; n is from 0 to 15; p, m, x and y are each independently from 1 to 12; q is 3 or 5; and R is hydrogen, an alkyl group, an alkenyl group, an aryl group, a carbonyl group, a sulfonyl group or a silyl group, and such a group may have a fluorine atom, an oxygen atom or other substituent;

$$(Li)_m(O)_n(B)_p(OOC\text{-}(A)_z\text{-}COO)_y(OWF_q)_x \quad (5)$$

wherein W is a boron atom or a phosphorus atom, A is a $C_{1-6}$ allylene group, alkenylene group or alkynylene group, a phenylene group, or an alkylene group having an oxygen atom or a sulfur atom in its main chain; m, p, x and y are each independently from 1 to 20; n is from 0 to 15; z is 0 or 1; and q is 3 or 5.

12 Claims, No Drawings

ELECTROLYTE FOR POWER STORAGE DEVICES AND NONAQUEOUS ELECTROLYTE SOLUTION

TECHNICAL FIELD

The present invention relates to an electrolyte for a storage device such as a lithium ion secondary battery, and a non-aqueous electrolytic solution for a storage device comprising it.

BACKGROUND ART

In recent years, as various portable electronic equipment such as portable electronic terminals represented by mobile phones and notebook computers are widely used, a secondary battery plays an important role as their power source. As such a secondary battery, an aqueous battery and a non-aqueous electrolyte battery may be mentioned. Particularly, a non-aqueous electrolyte secondary battery comprising a positive electrode and a negative electrode capable of absorbing and desorbing lithium ions, and a non-aqueous electrolytic solution provides a high energy density at a high voltage, is excellent in safety and has various advantages as compared with other secondary batteries in view of environmental problem, etc.

As a non-aqueous electrolyte secondary battery practically used at present, for example, a lithium ion secondary battery using as a cathode active material a composite oxide of lithium and a transition metal, as an anode active material a material capable of doping and undoping lithium ions may be mentioned. As an anode active material for a lithium ion secondary battery providing excellent cycle properties, a carbon material may be mentioned. Among carbon materials, graphite is expected as a material which can improve the energy density per unit volume.

Further, to improve properties of a lithium secondary battery, improvement in not only properties of the negative electrode and the positive electrode but also properties of the non-aqueous electrolytic solution which has a role to transfer lithium ions is required. As such a non-aqueous electrolytic solution, a non-aqueous solution having a lithium salt such as $LiBF_4$, $LiPF_6$, $LiClO_4$, $LiN(SO_2CF_3)_2$ or $LiN(SO_2CF_2CF_3)_2$ dissolved in an aprotic organic solvent has been used (Non-Patent Document 1). As representative examples of the aprotic organic solvent, carbonates have been known, and use of carbonate compounds such as ethylene carbonate, propylene carbonate and dimethyl carbonate have been proposed (Patent Documents 1 and 2).

On the other hand, the non-aqueous electrolytic solution having as the electrolyte $LiBF_4$, $LiPF_6$ or the like dissolved, is known to be stable at a high voltage since the conductivity representing transfer of lithium ions is high and the oxidative destruction voltage for $LiBF_4$ and $LiPF_6$ is high, and contributes to attainment of properties such as high voltage and high energy density of the lithium secondary battery.

When such a non-aqueous electrolyte secondary battery such as a lithium secondary battery is used as a power source, the non-aqueous electrolytic solution is required to lower the electric resistance to improve the lithium ion conductivity, and to suppress the decrease of the battery capacity and maintain a high capacity even after charging and discharging are repeatedly carried out, thereby to improve so-called cycle properties, thus prolonging the life.

In order to achieve such objects, modification of the structure of the lithium salt as an electrolyte contained in the non-aqueous electrolytic solution and addition of specific compounds have been proposed. For example, Patent Document 3 proposes addition of a vinyl sulfone derivative having a specific structure to a non-aqueous electrolytic solution. Further, Patent Document 4 proposes addition of a lithium salt having no boron atom, which is a lithium salt other than a bifunctional acid lithium salt having a specific structure.

Further, a solid-state lithium battery which is free from risk of firing due to flammability of an organic solvent in the non-aqueous electrolytic solution has been known, and as a lithium ion conductive polymer electrolyte for such a battery, an amorphous compound obtained by reacting a lithium salt such as lithium sulfide with e.g. boron sulfide, phosphorus sulfide or silicon sulfide has been known (Patent Documents 5 and 6). However, such a lithium compound is usually inferior in solubility in a non-aqueous electrolytic solution, and its use as an electrolytic solution for a storage device has been difficult.

PRIOR ART DOCUMENTS

Patent Documents

Patent Document 1: JP-A-H04-184872
Patent Document 2: JP-A-H10-027625
Patent Document 3: JP-A-H11-329494
Patent Document 4: JP-A-2014-022334
Patent Document 5: JP-A-H11-219722
Patent Document 6: JP-A-2003-068361

DISCLOSURE OF INVENTION

Technical Problem

The object of the present invention is to provide an electrolyte for a storage device such as a lithium secondary battery, which can be used instead of a lithium salt as a known electrolyte in a non-aqueous electrolytic solution of a storage device, can be used together with a known lithium salt in combination, and can be used as a solid-state polymer electrolyte not using a non-aqueous solvent and is thereby free from risk of firing.

Another object of the present invention is to provide a storage device such as a non-aqueous electrolyte and solid-state lithium secondary battery using the electrolyte, and a non-aqueous electrolytic solution and a polymer electrolyte to be used for such a storage device.

Solution To Problem

The present inventors have conducted extensive studies and as a result, found a novel electrolyte for a storage device which can achieve the above objects. The electrolyte is soluble in a non-aqueous solvent for a storage device such as a lithium ion secondary battery, whereby a non-aqueous electrolytic solution with low electrical resistance can be obtained, and a lithium secondary battery excellent in favorable initial properties and cycle properties is obtained and further, since the electrolyte itself has excellent lithium ion conductivity, a solid-state lithium secondary battery can be obtained. The present invention is accomplished based on these discoveries.

The present invention provides an electrolyte for a storage device, which comprises a lithium-containing complex compound represented by the following formula (1), (2), (3), (4) or (5):

wherein A is O, S, P or N; U is a boron atom or a phosphorus atom; m and n are each independently from 1 to 6; q is from 1 to 12; x is 3 or 5; and y is from 1 to 6;

$$(Li)_m(O)_n(B)_p(OWF_q)_x \quad (3)$$

wherein W is a boron atom or a phosphorus atom; m, p and x are each independently from 1 to 15; n is from 0 to 15; and q is 3 or 5;

$$(Li)_m(B)_p(O)n(OR)_y(OWF_q)_x \quad (4)$$

wherein W is a boron atom or a phosphorus atom; n is from 0 to 15; p, m, x and y are each independently from 1 to 12; q is 3 or 5; and R is hydrogen, an alkyl group, an alkenyl group, an aryl group, a carbonyl group, a sulfonyl group or a silyl group, and such a group may have a fluorine atom, an oxygen atom or other substituent;

$$(Li)_m(O)_n(B)_p(OOC-(A)_z-COO)_y(OWF_q)_x \quad (5)$$

wherein W is a boron atom or a phosphorus atom, A is a $C_{1-6}$ allylene group, alkenylene group or alkynylene group, a phenylene group, or an alkylene group having an oxygen atom or a sulfur atom in its main chain; m, p, x and y are each independently from 1 to 20; n is from 0 to 15; z is 0 or 1; and q is 3 or 5.

Advantageous Effects of Invention

According to the electrolyte for a storage device of the present invention, which is soluble in an organic solvent for a storage device such as a lithium ion secondary battery, a non-aqueous electrolytic solution with low electrical resistance can be obtained, an electrolyte for a storage device such as a lithium secondary battery excellent in initial properties and cycle properties is obtained, and further, since the electrolyte itself has excellent lithium ion conductivity, a solid-state lithium secondary battery can be obtained.

DESCRIPTION OF EMBODIMENTS

Electrolyte

The present invention provides an electrolyte for a storage device, which comprises a lithium-containing complex compound represented by the following formula (1), (2), (3), (4) or (5):

$$(Li)_m(A)_n(UF_x)_y \quad (1)$$

$$(Li)_m(Si)_n(O)_q(UF_x)_y \quad (2)$$

wherein A, U, m, n, q, x and y are as defined above;

$$(Li)_m(O)_n(B)_p(OWF_q)_x \quad (3)$$

wherein W, m, p, x, n and q are as defined above;

$$(Li)_m(B)_p(O)n(OR)_y(OWF_q)_x \quad (4)$$

wherein W, R, n, p, m, x, y and q are as defined above;

$$(Li)_m(O)_n(B)_p(OOC-(A)_z-COO)_y(OWF_q)_x \quad (5)$$

wherein W, A, m, p, x, y, n, z and q are as defined above.

In the above formulae (1) and (2), A is, in that a stable lithium salt is easily prepared, and in view of solubility in a solvent, preferably an oxygen atom, a sulfur atom, a phosphorus atom or a nitrogen atom, particularly preferably an oxygen atom or a sulfur atom. U is, in that bond with an oxygen atom, a sulfur atom or a nitrogen atom is easily formed, preferably a boron atom, a phosphorus atom or an arsenic atom, particularly preferably a boron atom or a phosphorus atom.

m and n are preferably from 1 to 6, particularly preferably from 2 to 6. q is, in view of solubility of the electrolyte in the solvent, preferably from 2 to 8, particularly preferably from 3 to 8.

x is, in view of solubility of the electrolyte in the solvent, preferably 3 or 5. y is, in that bond with an oxygen atom, a sulfur atom, a phosphorus atom or a nitrogen atom is easily formed, preferably from 1 to 6, particularly preferably from 1 to 5.

As examples of the lithium-containing complex compound, O—(BF$_3$Li)(Li), O—(BF$_3$Li)$_2$, S—(BF$_3$Li)(Li), S—(BF$_3$Li)$_2$, N—(BF$_3$Li)$_2$(Li), N—(BF$_3$Li)$_3$, P—(BF$_3$Li)$_2$(Li), P—(BF$_3$Li)$_3$, SiO$_3$(BF$_3$Li)(Li), SiO$_3$(BF$_3$Li)$_2$, O—(PF$_5$Li)(Li), O—(PF$_5$Li)$_2$, S—(PF$_5$Li)(Li) and S—(PF$_5$Li)$_2$ may be mentioned.

The lithium-containing complex compound is represented as above for convenience, however, O—(BF$_3$Li)(Li) for example is a complex having a structure of Li—O(—BF$_3^-$Li$^+$), and the same applies to the others.

The lithium-containing complex compound is, from the viewpoint of stability of the lithium-containing complex compound and solubility in a solvent, preferably O—(BF$_3$Li)(Li), O—(BF$_3$Li)$_2$, S—(BF$_3$Li)(Li), S—(BF$_3$Li)$_2$, N—(BF$_3$Li)$_3$, P—(BF$_3$Li)$_3$, SiO$_3$(BF$_3$Li)(Li) or SiO$_3$(BF$_3$Li)$_2$, particularly preferably O—(BF$_3$Li)(Li), O—(BF$_3$Li)$_2$, S—(BF$_3$Li)(Li), S—(BF$_3$Li)$_2$, SiO$_3$(BF$_3$Li)(Li), SiO$_3$(BF$_3$Li)$_2$, O—(PF$_5$Li)(Li), O—(PF$_5$Li)$_2$, S—(PF$_5$Li)(Li), S—(PF$_5$Li)$_2$ or N—(PF$_5$Li)$_3$.

The lithium-containing complex compound is obtained by reacting a lithium compound (A) represented by the following formula (6) or (7) and at least one boron fluoride compound (B) selected from the group consisting of boron trifluoride and a boron trifluoride complex or at least one phosphorus fluoride compound (C) selected from the group consisting of phosphorus pentafluoride and a phosphorus pentafluoride complex:

$$(Li)_m(A)_n \quad (6)$$

$$(Li)_m(Si)_n(O)_q \quad (7)$$

In the formulae (6) and (7), A, m, n and q are as defined in the above formulae (1) and (2) and the preferred embodiments are also the same.

The lithium compound (A) represented by the formula (3) may, for example, be lithium oxide, lithium carbonate, lithium sulfide, lithium phosphide or lithium nitride. Particularly, lithium oxide, lithium carbonate or lithium sulfide is preferred.

The lithium compound (A) represented by the formula (6) may, for example, be a chain lithium inosilicate such as lithium silicate, lithium metasilicate or lithium disilicate, a cyclic structure such as lithium cyclosilicate, a layered structure such as lithium phyllosilicate, or a three-dimensional structure lithium tectosilicate. Particularly, lithium silicate, lithium metasilicate or lithium disilicate is preferred.

The boron fluoride compound (B) may be boron trifluoride or a boron trifluoride complex. The boron trifluoride complex is formed of a boron atom of boron trifluoride and oxygen of an oxygen-containing compound, and is obtained by bringing boron trifluoride into contact with the oxygen-containing compound. The oxygen-containing compound may, for example, be water, methanol, ethanol, propanol, butanol, phenol, tetrahydrofuran, dimethyl ether, diethyl ether, dibutyl ether, ethylene carbonate, dimethyl carbonate, diethyl carbonate or ethyl methyl carbonate.

As specific examples of the boron fluoride compound (B), boron trifluoride, boron trifluoride dimethyl ether complex, boron trifluoride diethyl ether complex, boron trifluoride di-n-butyl ether complex, boron trifluoride di-tert-butyl ether complex, boron trifluoride tert-butyl methyl ether complex, boron trifluoride tetrahydrofuran complex, boron trifluoride methanol complex, boron trifluoride ethanol complex, boron trifluoride propanol complex, boron trifluoride butanol complex, boron trifluoride phenol complex, boron trifluoride ethylene carbonate complex, boron trifluoride ethyl methyl carbonate complex, boron trifluoride dimethyl carbonate complex and boron trifluoride diethyl carbonate complex may be mentioned. Among them, boron trifluoride, boron trifluoride dim ethyl ether complex, boron trifluoride diethyl ether complex, boron trifluoride methanol complex, boron trifluoride ethanol complex, boron trifluoride propanol complex and the like are preferred.

The phosphorus pentafluoride compound (C) may be phosphorus pentafluoride or a phosphorus pentafluoride complex. The phosphorus pentafluoride complex is formed of phosphorus pentafluoride and oxygen of an oxygen-containing compound, and is obtained by bringing phosphorus pentafluoride into contact with the oxygen-containing compound.

As specific examples of the phosphorus pentafluoride compound (C), phosphorus pentafluoride, phosphorus pentafluoride ethylene carbonate complex, phosphorus pentafluoride dimethyl methyl carbonate complex, phosphorus pentafluoride diethyl methyl carbonate complex, and phosphorus pentafluoride ethyl methyl carbonate complex may be mentioned. Among them, phosphorus pentafluoride, phosphorus pentafluoride dimethyl methyl carbonate complex, phosphorus pentafluoride diethyl methyl carbonate complex and phosphorus pentafluoride ethyl methyl carbonate complex are preferred.

The lithium-containing complex compound may be obtained by bringing the lithium compound (A), and the boron fluoride compound (B) and/or the phosphorus fluoride compound (C) into contact with each other in the presence or absence of a solvent, preferably in an inert gas atmosphere, to be reacted at preferably from 0 to 80° C., more preferably from 10 to 30° C. The solvent is not particularly limited so long as it is inert to the reaction and may, for example, be water, methanol, ethanol, propanol, butanol, phenol, tetrahydrofuran, dimethyl ether, diethyl ether, dibutyl ether, ethylene carbonate, dimethyl carbonate, diethyl carbonate or ethyl methyl carbonate.

Specifically, for example, the boron fluoride compound (B) and/or the phosphorus fluoride compound (C) is dissolved or dispersed in a solvent such as methanol, and to the resulting solution or dispersion, the lithium compound (A) is gradually added in an inert gas atmosphere of e.g. argon at preferably from 0 to 50° C., followed by stirring preferably at form 30 to 80° C. for from 1 to 24 hours, whereby reaction is carried out. The reaction liquid is concentrated and methanol as the solvent is removed to obtain crude lithium-containing complex compound.

The obtained crude lithium-containing complex compound is washed e.g. with ether, and the obtained purified product is vacuum-dried to obtain high purity lithium-containing complex compound.

In the formulae (3), (4) and (5), via part of oxygen bonded to boron, a complex bond is formed with W to stably form a boron-containing complex compound. Part of or entire boron in the lithium-containing boron complex compound can form a complex. The bonding manner is not particularly limited, and from the viewpoint of solubility in the solvent, with 8 boron atoms, at least one bond with W is preferably formed. Further, on the same boron atom, at least one complex bond with W may be formed.

W is, especially with a view to easily forming a bond with an oxygen atom, preferably a boron atom, phosphorus element or an arsenic atom, particularly preferably a boron atom or phosphorus element. Further, the number of moles of W is preferably from 30 to 100 per the number of moles of lithium atoms in the lithium-containing boron complex compound being 100.

A is, especially, preferably a $C_{1-6}$ alkylene group, preferably a $C_{2-6}$ alkenylene group or a $C_{2-6}$ alkynylene group.

As preferred examples of the alkylene group, methylene, ethylene, difluoromethylene, tetrafluoroethylene, hydroxyethylene, propylene, butylene, cyclopropylene, cyclobutylene and cyclohexylene may be mentioned. As preferred examples of the alkylene group having an oxygen atom or a sulfur atom in its main chain, a $C_{1-4}$ alkylene group having an oxygen atom or a sulfur atom bonded thereto may be mentioned.

As preferred examples of the alkenylene group, vinylene, propenylene, butenylene and pentenylene may be mentioned. Particularly, a $C_{2-6}$ alkenylene group having a double bond is preferred.

As preferred examples of the alkynylene group, ethynylene, propynylene, butynylene and pentynylene may be mentioned. Particularly, a $C_{3-6}$ alkynylene group is preferred.

As preferred examples of the phenylene group, phenylene and difluorophenylene may be mentioned.

In the formula (3), in the alkylene group, alkenylene group, alkynylene group, phenylene group or alkylene group having an oxygen atom or a sulfur atom in its main chain, as A, the hydrogen atom may optionally be substituted by halogen, a hydroxy group, a cyano group or a nitro group.

R is preferably an alkyl group, an alkenyl group, an aryl group, a carbonyl group, a sulfonyl group, a silyl group, a boron-containing group or a phosphorus-containing group, particularly preferably an alkyl group, a carbonyl group, a sulfonyl group, a phenyl group, a silyl group, a boron-containing group or a phosphorus-containing group.

n is preferably from 0 to 15, and m, p and y are especially preferably from 1 to 20, particularly preferably from 1 to 12. q is preferably 3 or 5. x is especially preferably from 1 to 8 in view of the solubility of the electrolyte in the solvent, and particularly preferably from 2 to 8.

As examples of the lithium-containing boron complex compound represented by the formula (3), $BO(OBF_3Li)$, $B_4O_5(OBF_3Li)_2$, $LiB_4O_6(OBF_3Li)$, $B_8O_{13}(OBF_3Li)_4$, $B_6O_9(OBF_3Li)_2$, $B_8O_9(OBF_3Li)_2$, $B_5O_7(OBF_3Li)$, $B_7O_{10}(OBF_3Li)$, $BO(OBF_3Li)_3$, $LiBO(OBF_3Li)_2$, $Li_2BO_2(OBF_3Li)$, $B_2O(OBF_3Li)_4$, $Li_2B_2O_3(OBF_3Li)_2$, $B_3O_7(OBF_3Li)_5$, $B_4O_3(OBF_3Li)_6$, $Li_2B_4O_5(OBF_3Li)_4$, $Li_2B_2O(OBF_3Li)_6$, $Li_3B_2O_2(OBF_3Li)_5$, $Li_4B_2O_3(OBF_3Li)_4$, $Li_5B_2O_4(OBF_3Li)_3$, $Li_6B_2O_5(OBF_3Li)_2$, $Li_2B_6o7(OBF_3Li)_6$ and $Li_4B_6O_9(OBF_3Li)_4$ may be mentioned.

As examples of the lithium-containing boron complex compound represented by the formula (4), $B(OC(=O)CH_3)_2(OBF_3Li)$, $B(OC(=O)CF_3)_2(OBF_3Li)$, $B_2O(OCH_3)_2(OBF_3Li)_2$, $B_2O(OCH_2CH_3)_2(OBF_3Li)_2$, $B_2O(OCF_2CF_3)_2(OBF_3Li)_2$, $B_2O(OC(=O)CH_3)_2(OBF_3Li)_2$, $B_2O(OC(=O)CF_3)_2(OBF_3Li)_2$, $LiB_2O_2(OC(=O)CF_3)_2(OBF_3Li)$, $B_2O(OSO_2CH_3)_2(OBF_3Li)_2$, $B_2OOSO_2CF_3)_2(OBF_3Li)_2$, $LiB_2O_2(OSO2CF_3)_2(OBF_3Li)$ and $B_2O(OSi(CH_3)_3)_2(OBF_3Li)_2$ may be mentioned.

As examples of the lithium-containing boron complex compound represented by the formula (5), BO(OOC—

COO)(OBF$_3$Li), BO(OOCCH$_2$COO)(OBF$_3$Li), BO(OOC(CH$_2$)$_2$COO)(OBF$_3$Li), BO(OOC(CF$_2$)$_2$COO)(OBF$_3$Li), BO(OOC(CH$_2$)$_3$COO)(OBF$_3$Li), BO(OOC(CH$_2$C(=CH$_2$))COO)(OBF$_3$Li), BO(OOC(C(CH$_2$)$_3$)COO)(OBF$_3$Li), BO(OOCCH$_2$OCH$_2$COO)(OBF$_3$Li), BO(OOCCH$_2$SCH$_2$COO)(OBF$_3$Li), BO(OOCC$_2$H$_4$SC$_2$H$_4$COO)(OBF$_3$Li), B$_4$O$_3$(OOC—COO)$_2$(OBF$_3$Li)$_2$, lib$_4$O$_4$(OOC—COO)$_2$(OBF$_3$Li), B$_4$O$_3$(OOCCH$_2$COO)$_2$(OBF$_3$Li)$_2$, B$_4$O$_3$(OOCCH$_2$SCH$_2$COO)$_2$(OBF$_3$Li)$_2$, LiB$_4$O$_4$(OOCCH$_2$SCH$_2$COO)$_2$(OBF$_3$Li), B$_4$O$_3$(OOC(CH$_2$C(=CH$_2$))COO)$_2$(OBF$_3$Li)$_2$, Li$_2$B$_2$O(OOC—COO)$_2$(OBF$_3$Li)$_2$, Li$_2$B$_2$O(OOCCH$_2$COO)$_2$(OBF$_3$Li)$_2$, Li$_2$B$_2$O(OOCCH$_2$SCH$_2$COO)$_2$(OBF$_3$Li)$_2$, and Li$_2$B$_2$O(OOC(CH$_2$C(=CH$_2$))COO)$_2$(OBF$_3$Li)$_2$ may be mentioned.

The lithium-containing boron complex compound is represented by the proportion of element as above for convenience, not by the bond structure of the complex.

The content of the lithium-containing boron complex compound in the non-aqueous electrolytic solution of the present invention is preferably from 0.01 to 30 mass %, more preferably from 0.1 to 25 mass %, particularly preferably from 0.1 to 5 mass %. If the content is less than 0.01 mass %, the effect to reduce the resistance tends to be low. On the other hand, if it exceeds 30 wt %, the resistance tends to be high, and the life tends to be impaired.

The lithium-containing boron complex compound is obtained by reacting a lithium-containing boron compound (D) represented by the following formula (8), (9) or (10), and at least one boron fluoride compound (E) selected from the group consisting of boron trifluoride and a boron trifluoride complex or at least one phosphorus fluoride compound (F) selected from the group consisting of phosphorus pentafluoride and a phosphorus pentafluoride complex:

 (8)

 (9)

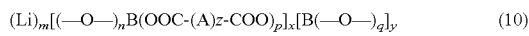 (10)

In the formulae (8), (9) and (10), A, R, m, n, p, q, x, y and z are as defined in the above formulae (3), (4) and (5), and the preferred embodiments are also the same.

In the lithium-containing boron compound represented by the formula (8), m, p and n are each independently from 1 to 20.

As preferred specific examples of the lithium-containing boron compound represented by the formula (8), LiBO$_2$, Li$_2$B$_4$O$_7$, Li$_4$B$_8$O$_{17}$, Li$_2$B$_6$O$_{11}$, Li$_2$B$_8$O$_{11}$, LiB$_5$O8, LiB$_7$O$_{11}$, Li$_3$BO$_3$, Li$_4$B$_2$O$_5$, Li$_5$B$_3$O$_7$, Li$_6$B$_4$O$_9$, Li$_8$B$_2$O$_7$ and Li$_8$B$_6$O$_{13}$ may be mentioned.

In the lithium-containing boron compound represented by the formula (9), n, m, x and y are each independently from 1 to 12, R is hydrogen, an alkyl group, an alkenyl group, an aryl group, a carbonyl group, a sulfonyl group or a silyl group, and such a group may have a fluorine atom, an oxygen atom or other substituent.

R is preferably an alkyl group, an alkenyl group, an aryl group, a carbonyl group, a sulfonyl group, a silyl group, a boron-containing group or a phosphorus-containing group, particularly preferably an alkyl group, a carbonyl group, a sulfonyl group, a phenyl group, a silyl group, a boron-containing group or a phosphorus-containing group.

The alkyl group is preferably a C$_{1-8}$ chain or cyclic alkyl group. The C$_{1-8}$ chain or cyclic alkyl group may, for example, be a methyl group, an ethyl group, a propyl group, a butyl group, a hexyl group, a cyclopropyl group, a cyclobutyl group, a cyclohexyl group, a hydroxy ethyl group, a trifluoromethyl group or a hexafluoroethyl group.

The alkenyl group is preferably a C$_{2-5}$ alkenyl group having a double bond, such as a vinyl group, a propenyl group, a butenyl group or a heptenyl group.

As preferred examples of the aryl group, a phenyl group, a benzyl group, a tolyl group and a xylyl group may be mentioned.

As preferred examples of the carbonyl group, a methylcarbonyl group, an ethylcarbonyl group, a propylcarbonyl group, a butylcarbonyl group, a cyclopropylcarbonyl group, a cyclobutylcarbonyl group, a trifluoromethylcarbonyl group and a pentafluoroethylcarbonyl group may be mentioned.

As preferred examples of the sulfonyl group, a methylsulfonyl group, an ethylsulfonyl group, a propylsulfonyl group, a benzylsulfonyl group, a trifluoromethylsulfonyl group and a pentafluoroethylsulfonyl group may be mentioned.

As preferred examples of the silyl group, a trimethylsilyl group, a triethylsilyl group, a triisopropylsilyl group and a butyldimethylsilyl group may be mentioned.

As preferred examples of the boron-containing group, a dimethylboryl group and a dimethoxyboryl group may be mentioned.

As preferred specific examples of the lithium-containing boron compound represented by the formula (9), LiBO(OC(=O)CH$_3$)$_2$, LiBO(OC(=O)CF$_3$)$_2$, Li$_2$B$_2$O$_3$(OCH$_3$)$_2$, Li$_2$B$_2$O$_3$(OCH$_2$CH$_3$)$_2$, Li$_2$B$_2$O$_3$(OCF$_2$CF$_3$)$_2$, Li$_2$B$_2$O$_3$(OC(=O)CH$_3$)$_2$, Li$_2$B$_2$O$_3$(OC(=O)CF$_3$)$_2$, Li$_2$B$_2$O$_3$(OSO$_2$CH$_3$)$_2$, Li$_2$B$_2$O$_3$(OSO$_2$CF$_3$)$_2$ and Li$_2$B$_2$O$_3$(OSi(CH$_3$)$_3$)$_2$ may be mentioned.

In the lithium-containing boron compound represented by the formula (10), A is a C$_{1-6}$ alkylene group, alkenylene group or alkynylene group, a phenylene group, or an alkylene group having an oxygen atom or a sulfur atom in its main chain. n and p are each independently 1 or 2, q is from 0 to 3, and m, x, y and z are each independently from 0 to 10.

Particularly, A is preferably a C$_{1-6}$, more preferably C$_{2-6}$ alkylene group, alkenylene group or alkynylene group.

As preferred examples of the alkylene group, methylene, ethylene, tetrafluoroethylene, hydroxyethylene, propylene, butylene, cyclopropylene, cyclobutylene and cyclohexylene may be mentioned.

The alkenylene group is preferably a C$_{2-5}$ alkenylene group having a double bond. The C$_{2-4}$ alkenylene group having a double bond may, for example, be vinylene, propenylene, butenylene or pentenylene.

As preferred examples of the phenylene group, phenylene and difluorophenylene may be mentioned. As preferred examples of the alkylene group having an oxygen atom or a sulfur atom in its main chain, a C$_{1-4}$ alkylene group having an oxygen atom or a sulfur atom bonded thereto may be mentioned, and as the alkylene group, methylene, ethylene, tetrafluoroethylene, propylene, butylene, cyclopropylene and cyclobutylene may, for example, be mentioned.

In the alkylene group, alkenylene group, alkynylene group, phenylene group or alkylene group having an oxygen atom or a sulfur atom in its main chain, as A, the hydrogen atom may optionally be substituted by halogen, a hydroxy group, a cyano group or a nitro group.

In the formula (6), n and p are preferably each independently 1 or 2, and m, x, y and z are preferably each independently from 0 to 10.

As the preferred specific examples of the lithium-containing boron compound, LiBO(OOC—COO), LiBO (OOCCH$_2$COO), LiBO(OOC(CH$_2$)$_2$COO), LiBO(OOC(CF$_2$)$_2$COO), LiBO(OOC(CH$_2$)$_3$COO), LiBO(OOC(CH$_2$C(=CH$_2$))COO), LiBO(OOC(C(CH$_2$)$_3$)COO), LiBO(OOCCH$_2$OCH$_2$COO), LiBO(OOCCH$_2$SCH$_2$COO), LiBO(OOCC$_2$H$_4$SC$_2$H$_4$COO), Li$_2$B$_4$O$_5$(OOCC—COO)$_2$, Li$_2$B$_4$O$_5$(OOCCH$_2$COO)$_2$, Li$_2$B$_4$O$_5$(OOCCH$_2$SCH$_2$COO)$_2$, Li$_2$B$_4$O$_5$(OOC(CH$_2$C(=CH$_2$))COO)$_2$, Li$_4$B$_2$O$_3$(OOC—COO)$_2$, Li$_4$B$_2$O$_3$(OOCCH$_2$COO)$_2$, Li$_4$B$_2$O$_3$(OOCCH$_2$SCH$_2$COO)$_2$, and Li$_4$B$_2$O$_3$(OOC(CH$_2$C(=CH$_2$))COO)$_2$ may be mentioned.

The lithium-containing boron compound may easily be obtained by the same method for producing a lithium salt such as lithium tetraborate. For example, an aqueous solution of boric acid, a lithium compound such as lithium hydroxide or lithium carbonate, and a corresponding carboxylic acid compound is kept at from 20 to 80° C., whereby precursor crystals can easily be obtained. The obtained crystals are dehydrated under a condition of from 200 to 400° C., whereby the lithium-containing boron compound can suitably be obtained.

The boron fluoride compound (E) may be boron trifluoride or a boron trifluoride complex. The boron trifluoride complex is formed of a boron atom of boron trifluoride and oxygen of an oxygen-containing compound, and is obtained by bringing the boron trifluoride into contact with the oxygen-containing compound. The oxygen-containing compound may, for example, be water, methanol, ethanol, propanol, butanol, phenol, tetrahydrofuran, dimethyl ether, diethyl ether, dibutyl ether, ethylene carbonate, dimethyl carbonate, diethyl carbonate or ethyl methyl carbonate.

The phosphorus pentafluoride compound (F) may be phosphorus pentafluoride or a phosphorus pentafluoride complex. The phosphorus pentafluoride complex is formed of phosphorus pentafluoride and oxygen of an oxygen-containing compound, and is obtained by bringing phosphorus pentafluoride into contact with the oxygen-containing compound.

As specific examples of the phosphorus pentafluoride compound (F), phosphorus pentafluoride, phosphorus pentafluoride ethylene carbonate complex and phosphorus pentafluoride ethyl methyl carbonate complex may be mentioned. Among them, phosphorus pentafluoride and phosphorus pentafluoride ethyl methyl carbonate complex are preferred.

The lithium-containing boron complex compound may be obtained by bringing the lithium-containing boron compound (D), the boron fluoride compound (E) and/or the phosphorus fluoride compound (F) into contact with each other in the presence or absence of a solvent, preferably in an inert gas atmosphere, to be reacted at preferably from 0 to 80° C., more preferably from 10 to 30° C. The solvent is not particularly limited so long as it is inert to the reaction and may, for example, be water, methanol, ethanol, propanol, butanol, phenol, tetrahydrofuran, dimethyl ether, diethyl ether, dibutyl ether, ethylene carbonate, dimethyl carbonate, diethyl carbonate or ethyl methyl carbonate.

Specifically, for example, the boron fluoride compound (E) and/or the phosphorus fluoride compound (F) is dissolved or dispersed in a solvent such as methanol, and to the resulting solution or dispersion, the lithium-containing boron compound (D) is gradually added in an inert gas atmosphere of e.g. argon at preferably from 0 to 50° C., followed by stirring at preferably from 30 to 80° C. for from 1 to 24 hours, whereby reaction is carried out. The reaction liquid is concentrated and methanol as the solvent is removed to obtain crude lithium-containing boron complex compound.

The obtained crude lithium-containing boron complex compound is washed e.g. with ether, and the obtained purified product is vacuum-dried to obtain high purity lithium-containing boron complex compound.

Non-Aqueous Solvent

In a case where the electrolyte of the present invention is used for the non-aqueous electrolytic solution, as the non-aqueous solvent, various organic solvents may be used. For example, an aprotic polar solvent is preferred. As specific examples thereof, cyclic carbonates such as ethylene carbonate, propylene carbonate, 1,2-butylene carbonate, 2,3-butylene carbonate, 1,2-pentylene carbonate, 2,3-pentylene carbonate, trifluoromethylethylene carbonate, fluoroethylene carbonate and 4,5-difluoroethylene carbonate; lactones such as γ-butyrolactone and γ-valerolactone; cyclic sulfones such as sulfolane; cyclic ethers such as tetrahydrofuran and dioxane; chain carbonates such as ethyl methyl carbonate, dimethyl carbonate, diethyl carbonate, methyl propyl carbonate, methyl isopropyl carbonate, dipropyl carbonate, methyl butyl carbonate, dibutyl carbonate, ethyl propyl carbonate and methyl trifluoroethyl carbonate; nitriles such as acetonitrile; chain ethers such as dimethyl ether; chain carboxylic acid esters such as methyl propionate; chain glycol ethers such as dimethoxyethane; and fluorinated ethers such as 1,1,2,2-tetrafluoroethyl-2,2,3,3-tetrafluoropropyl ether, 1,1,2,2-tetrafluoroethyl-2,2,3,3,3-pentafluoropropyl ether and ethoxy-2,2,2-trifluoroethyoxy-ethane may be mentioned. They may be used alone or in combination of two or more.

The non-aqueous solvent is, from the viewpoint of ion conductivity, more preferably a carbonate solvent such as a cyclic carbonate or a chain carbonate. It is more preferred to use, as the carbonate solvent, the cyclic carbonate and the chain carbonate in combination. The cyclic carbonate is, among the above, preferably ethylene carbonate, propylene carbonate or fluoroethylene carbonate. The chain carbonate is, among the above, preferably ethyl methyl carbonate, dimethyl carbonate or diethyl carbonate. When the carbonate solvent is used, with a view to improving battery properties, as the case requires, other non-aqueous solvent such as a nitrile compound or a sulfone compound may further be added.

It is particularly preferred to use, as the non-aqueous solvent, a chain carbonic acid ester, a saturated cyclic carbonic acid ester or an unsaturated cyclic carbonic acid ester. It is particularly preferred to use the three types of the carbonic acid esters. As the non-aqueous solvent, in the non-aqueous electrolytic solution, the chain carbonic acid ester, the saturated cyclic carbonic acid ester and the unsaturated cyclic carbonic acid ester are contained preferably in contents of from 30 to 80 wt %, from 10 to 50 wt % and from 0.01 to 5 wt %, respectively, more preferably from 50 to 70 wt %, from 20 to 30 wt % and from 0.1 to 2 wt %.

If the content of the chain carbonic acid ester is lower than 30 wt %, the electrolytic solution tends to have an increased viscosity and in addition solidify at low temperature and thereby exhibits no sufficient properties, and if the content is higher than 80 wt %, the degree of dissociation/solubility of the lithium salt decreases, and the ion conductivity of the electrolytic solution decreases. If the content of the saturated cyclic carbonic acid ester is lower than 10 wt %, the degree of dissociation/solubility of the lithium salt decreases, and the ion conductivity of the electrolytic solution decreases, and if the content is higher than 50 wt %, the electrolytic solution tends to have an increased viscosity and in addition solidify at low temperature and thereby exhibits no sufficient properties.

Further, if the content of the unsaturated cyclic carbonic acid ester is lower than 0.01 wt %, no favorable coating film will be formed on the surface of the negative electrode, and cycle properties tend to deteriorate, and if the content is higher than 5 wt %, the electrolytic solution tends to gas when stored at high temperature and the pressure in the battery tends to increase, such being practically unfavorable.

The chain carbonic acid ester may, for example, be a $C_{3-9}$ chain carbonate. It may, for example, be specifically dimethyl carbonate, diethyl carbonate, methyl ethyl carbonate, di-n-propyl carbonate, diisopropyl carbonate, n-propyl isopropyl carbonate, di-n-butyl carbonate, di-t-butyl carbonate, n-butyl isobutyl carbonate, n-butyl-t-butyl carbonate, isobutyl-t-butyl carbonate, ethyl methyl carbonate, methyl-n-propyl carbonate, n-butyl methyl carbonate, isobutyl methyl carbonate, t-butyl methyl carbonate, ethyl-n-propyl carbonate, n-butyl ethyl carbonate, isobutyl ethyl carbonate, t-butyl ethyl carbonate, n-butyl-n-propyl carbonate, isobutyl-n-propyl carbonate, t-butyl-n-propyl carbonate, n-butyl isopropyl carbonate, isobutyl isopropyl carbonate or t-butyl isopropyl carbonate. Among them, the chain carbonic aid ester is preferably dimethyl carbonate, diethyl carbonate or methyl ethyl carbonate, but it is not particularly limited thereto. Such chain carbonic acid esters may be used as a mixture of two or more.

As the saturated cyclic carbonic acid ester, for example, ethylene carbonate, propylene carbonate, butylene carbonate and fluoroethylene carbonate may be mentioned. Among them, ethylene carbonate, propylene carbonate and fluoroethylene carbonate are more preferred, and by using propylene carbonate, a non-aqueous electrolytic solution stable at a wider temperature range can be provided. Such saturated cyclic carbonic acid esters may be used as a mixture of two or more.

Further, as the unsaturated cyclic carbonic acid ester, a vinylene carbonate derivative represented by the following formula (I) may be mentioned.

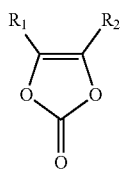

(I)

In the formula (I), $R_1$ and $R_2$ are each independently a hydrogen atom, a halogen atom, or a $C_{1-12}$ alkyl group which may contain a halogen atom. It is preferred that $R_1$ and $R_2$ are hydrogen (that is, the compound of the formula (I) is vinylene carbonate).

As specific examples of the vinylene carbonate derivative, vinylene carbonate, fluorovinylene carbonate, methylvinylene carbonate, fluoromethylvinylene carbonate, ethylvinylene carbonate, propylvinylene carbonate, butylvinylene carbonate, dimethylvinylene carbonate, diethylvinelene carbonate and dipropylvinylene carbonate may be mentioned, but the vinylene carbonate derivative is not limited thereto.

Among them, vinylene carbonate is effective and is economically effective also. As the vinylene carbonate derivative, at least one member is used, and such vinylene carbonate derivatives may be used alone or as a mixture.

Further, as other unsaturated cyclic carbonic acid ester, an alkenylethylene carbonate represented by the following formula (II) may be mentioned.

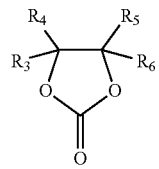

(II)

In the above formula (II), $R_3$ to $R_6$ are each independently a hydrogen atom, a halogen atom, a $C_{1-12}$ hydrocarbon group which may contain a halogen atom, or a $C_{2-12}$ alkenyl group, and at least one of them is a $C_{2-12}$ alkenyl group. As specific examples of the alkenylethylene carbonate wherein at least one of $R_3$ to $R_6$ is a vinyl group and the other is hydrogen, 4-vinylethylene carbonate, 4-vinyl-4-methylethylene carbonate, 4-vinyl-4-ethylethylene carbonate and 4-vinyl-4-n-propylethylene carbonate may be mentioned.

The non-aqueous solvent may further contain, in addition to the above component, other solvent. Such other solvent may, for example, be a cyclic carboxylic acid ester, a $C_{3-9}$ chain ester, or a $C_{3-6}$ chain ether. The content of such other solvent is preferably from 0.2 to 10 wt %, particularly preferably from 0.5 to 5 wt % in the non-aqueous electrolytic solution.

As the cyclic carboxylic acid ester (a $C_{3-9}$ lactone compound), for example, γ-butyrolactone, γ-valerolactone, γ-caprolactone and ε-caprolactone may be mentioned. Among them, γ-butyrolactone and γ-valerolactone are more preferred. Such cyclic carboxylic acid esters may be used as a mixture of two or more.

Further, as the $C_{3-9}$ chain ester, for example, methyl acetate, ethyl acetate, n-propyl acetate, isopropyl acetate, n-butyl acetate, isobutyl acetate, t-butyl acetate, methyl propionate, ethyl propionate, n-propyl propionate, isopropyl propionate, n-butyl propionate, isobutyl propionate and t-butyl propionate may be mentioned. Among them, ethyl acetate, methyl propionate and ethyl propionate are preferred.

Further, as the $C_{3-6}$ chain ether, dimethoxymethane, dimethoxyethane, diethoxymethane, diethoxyethane, ethoxymethoxymethane and ethoxymethoxyethane may, for example, be mentioned. Among them, dimethoxyethane and diethoxyethane are more preferred.

Further, benzonitrile, acetonitrile, tetrahydrofuran, 2-methyltetrahydrofuran, dioxolane, 4-methyldioxolane, N,N-dimethylformamide, dimethylacetamide, dimethyl sulfoxide, dioxane, sulfolane, dichloroethane, chlorobenzene, nitrobenzene and the like may be used.

Lithium Salt

In the non-aqueous electrolytic solution, in addition to the above electrolyte of the present invention, a known lithium salt may be dissolved. Specific examples of such a lithium salt are as follows.
(A) Inorganic Lithium Salts:
Inorganic fluoride salts such as $LiPF_6$, $LiAsF_6$ and $LiBE_4$, perhalogen acid salts such as $LiClO_4$, $LiBrO_4$ and $LiIO_4$, etc.
(B) Organic Lithium Salts:
Organic sulfonates such as $LiCF_3SO_3$; perfluoroalkylsulfonic acid imide salts such as $LiN(CF_3SO_2)_2$, LiN $(C_2F_5SO_2)_2$ and $LiN(CF_3SO_2)(C_4F_9SO_2)$, perfluoroalkylsulfonic acid methide salts such as $LiC(CF_3SO_2)_3$; inorganic fluoride fluorophosphates having some of fluorine atoms substituted with a perfluoroalkyl group, such as $LiPF(CF_3)_5$, $LiPF_2(CF_3)_4$, $LiPF_3(CF_3)_3$, $LiPF_2(C_2F_5)_4$, $LiPF_3(C_2F_5)_3$, $LiPF(n-C_3F_7)_5$, $LiPF_2(n-C_3F_7)_4$, $LiPF_3(n-C_3F_7)_3$, $LiPF(iso-C_3F_7)_5$, $LiPF_2(iso-C_3F_7)_4$, $LiPF_3(iso-C_3F_7)_3$, $LIB(CF_3)_4$, $LiBF(CF_3)_3$, $LiBF_2(CF_3)_2$, $LiBF_3(CF_3)$, $LiB(C_2F_5)_4$, $LiBF(C_2F_5)_3$, $LiBF_2(C_2F_5)_2$, $LiBF_3(C_2F_5)$, $LiB(n-C_3F_7)_4$, $LiBF(n-C_3F_7)_3$, $LiBF_2(n-C_3F_7)_2$, $LiBF_3(n-C_3F_7)$, $LIB(iso-C_3F_7)_4$, $LIBF(iso-C_3F_7)_3$, $LIBF_2(iso-C_3F_7)_2$ and $LiBF_3(iso-C_3F_7)$, and fluorinated organic lithium salts of a perfluoroalkyl.

Among them, $LiPF_6$, $LiBF_4$, $LiN(CF_3SO_2)_2$, $LiN(C_2F_5SO_2)_2$, $LiN(CF_3SO_2)(C_2F_5SO_2)$ and $LiN(CF_3SO_2)(C_4F_9SO_2)$ are more preferred. Such lithium salts may be used as a mixture of two or more.

The content of the electrolyte of the present invention in the non-aqueous electrolytic solution is preferably from 0.01 to 10 mol/L, more preferably from 0.01 to 3.0 mol/L. If the concentration is too low, ion conductivity of the non-aqueous electrolytic solution is insufficient due to absolute concentration insufficiency, and if the concentration is too high, ion conductivity will decrease due to increase of the viscosity, and deposition at low temperature tends to occur, whereby performance of the non-aqueous electrolyte battery tends to decrease.

Further, in a case where the non-aqueous electrolytic solution contains the above known lithium compound, the concentration of the lithium salt is, in the non-aqueous electrolytic solution, preferably from 0.5 to 3 mol/L, particularly preferably from 0.7 to 2 mol/L. If the concentration is too low, the ion conductivity of the non-aqueous electrolytic solution is insufficient due to absolute concentration insufficiency, and if the concentration is too high, ion conductivity will decrease due to increase of the viscosity, and deposition at low temperature tends to occur, whereby performance of the non-aqueous electrolyte battery tends to decrease.

Other Additive

The non-aqueous electrolytic solution may contain, in addition to the lithium salt and the lithium-containing boron compound, other additive, so as to improve the life and the resistance of the storage device. As such other additive, for example, at least one member selected from the group consisting of a sulfur-containing compound, a cyclic acid anhydride, a carboxylic acid compound and a boron-containing compound may be used.

As the sulfur-containing compound, 1,3-propanesultone (PS), propenesultone, ethylene sulfite, hexahydrobenzo[1,3,2]dioxolane-2-oxide (also called 1,2-cyclohexanediol cyclic sulfite), 5-vinyl-hexahydro-1,3,2-benzodioxathioI-2-oxide, 1,4-butanediol dimethanesulfonate, 1,3-butanediol dimethanesulfonate, methylene methanedisulfonate, ethylene methanedisulfonate, N,N-dimethylmethanesulfonamide, N,N-diethylmethanesulfonamide, divinylsulfone and 1,2-bis(vinylsulfonyl)methane may, for example, be mentioned.

As the cyclic acid anhydride, carboxylic anhydrides such as glutaric anhydride, maleic anhydride, citraconic anhydride, glutaconic anhydride, itaconic anhydride, succinic anhydride, diglycolic anhydride, cyclohexanedicarboxylic anhydride, cyclopentanetetracarboxylic dianhydride, 4-cylohexene-1,2-dicarboxylic anhydride, 3,4,5,6-tetrahydrophthalic anhydride, 5-norbornene-2,3-dicarboxylic anhydride, phenylsuccinic anhydride, 2-phenylglutaric anhydride, phthalic anhydride, pyromellitic anhydride, fluorosuccinic anhydride and tetrafluorosuccinic anhydride, 1,2-ethanedisulfonic anhydride, 1,3-propanedisulfonic anhydride, 1,4-butanedisulfonic anhydride, 1,2-benzenedisulfonic anhydride, tetrafluoro-1,2-ethanedisulfonic anhydride, hexafluoro-1,3-propanedisulfonic anhydride, octafluoro-1,4-butanedisulfonic anhydride, 3-fluoro-1,2-benzenedisulfonic anhydride, 4-fluoro-1,2-benezenedisulfonic anhydride and 3,4,5,6-tetrafluoro-1,2-benzenedisulfonic anhydride may, for example, be mentioned.

As the carboxylic acid compound, lithium oxalate, lithium malonate, lithium difluoromalonate, lithium succinate, lithium tetrafluorosuccinate, lithium adipate, lithium glutarate, lithium acetonedicarboxylate, lithium 2-oxobutyrate, lithium oxaloacetate, lithium 2-oxoglutarate, lithium acetoacetate, 3-oxocylobutanecarboxylic acid, 3-oxocyclopentanecarboxylic acid, lithium 2-oxovalerate, lithium pyruvate, lithium glyoxylate, lithium 3,3-dimethyl-2-oxobutyrate, lithium 2-hydroxypropionate, lithium 2-methyl lactate, lithium tartrate, lithium cyanoacetate, lithium 2-mercaptopropionate, lithium methylenebis(thioglycolate)thiodisuccinate, lithium 3-(methylthio)propionate, lithium 3,3'-thiodipropionate, lithium dithiodiglycolate, lithium 2,2'-thiodiglycolate, lithium thiazolidine-2,4-dicarboxylate and lithium acetylthioacetate may, for example, be mentioned.

As the boron-containing compound, $LiBF_2$ $(C_2O_4)$, $LiB(C_2O_4)_2$, $LiBF_2(CO_2CH_2CO_2)$, $LiB(CO_2CH_2CO_2)_2$, $LiB(CO_2CF_2CO_2)_2$, $LiBF_2(CO_2CF_2CO_2)$, $LiBF_3(CO_2CH_3)$, $LiBF_3(CO_2CF_3)$, $LiBF_2(CO_2CH_3)_2$, $LiBF_2(CO_2CF_3)_2$, $LiBF(CO_2CH_3)_3$, $LiBF(CO_2CF_3)_3$, $LiB(CO_2CH_3)_4$, $LiB(CO_2CF_3)_4$, $Li_2B_2O_7$ and $Li_2B_2O_4$ may, for example, be mentioned.

Each of the above other additives may be used anole or in combination of two or more. Further, in a case where the non-aqueous electrolytic solution contains the additive, its content in the non-aqueous electrolytic solution is preferably from 0.01 to 5 mass %, more preferably from 0.1 to 2 mass %.

Storage Device

The electrolyte of the present invention may be used, as described above, for either of the non-aqueous electrolyte storage device and the solid-state storage device. The storage device may, for example, be a lithium (ion) secondary battery, an electric double layer capacitor, and a hybrid battery of which one of the positive electrode and the negative electrode is a battery and the other electrode is a double layer. The electrolyte of the present invention may be used for such a storage device by any know method.

Now, as a representative example, a non-aqueous electrolyte lithium ion secondary battery will be described.

As the anode active material constituting the negative electrode of the lithium ion secondary batter, any one of a carbon material capable of doping and undoping lithium ions, metal lithium, a lithium-containing alloy, silicon which can be alloyed with lithium, a silicon alloy, tin, a tin alloy, tin oxide capable of doping and undoping lithium ions, silicon oxide, a transition metal oxide capable of doping and undoping lithium ions, a transition metal nitride compound capable of doping and undoping lithium ions, and a mixture thereof may be used.

The negative electrode commonly has a constitution such that an anode active material is formed on a current collector such as a copper foil or an expanded metal. In order to improve adhesion of the anode active material to the current corrector, a binder such as a polyvinylidene fluoride binder or a latex binder may be incorporated, or carbon black, amorphous whisker carbon or the like as an electrically conducting aid may be added.

As a carbon material constituting the anode active material, for example, pyrolytic carbon, coke (such as pitch coke, needle coke, petroleum coke), graphite, an organic polymer fired product (carbonized phenol resin, furan resin or the like fired at an appropriate temperature), carbon fibers and activated carbon may, for example, be mentioned. The carbon material may be graphitized one. The carbon material is preferably a carbon material having interplanar spacing (d002) of (002) plane measured by X-ray diffraction of at most 0.340 nm, and preferably graphite having a true density of at least 1.70 g/cm$^3$ or a highly crystalline carbon material having properties close to those of the graphite. By using such a carbon material, the energy density of the non-aqueous electrolyte battery can be increased.

Further, the above carbon material containing boron, coated with a metal such as gold, platinum, silver, copper, Sn or Si, or coated with amorphous carbon may, for example, be used. Such carbon materials may be used alone or as a mixture of two or more in combination.

Further, silicon which can be alloyed with lithium, a silicon alloy, tin, a tin alloy, tin oxide capable of doping and undoping lithium ions, silicon oxide and a transition metal oxide capable of doping and undoping lithium ions, have a theoretical capacity per weight higher than the above carbon material and are thereby suitable.

On the other hand, the cathode active material constituting the positive electrode may be formed of various materials capable of charging and discharging. For example, a lithium-containing transition metal oxide, a lithium-containing transition metal composite oxide using at least one type of transition metal, a transition metal oxide, a transition metal sulfide, a metal oxide and an olivine metal lithium salt may be mentioned. For example, a composite oxide (lithium/transition metal composite oxide) of lithium and at least one type of transition metal represented by $LixMO_2$ (wherein M is at least one type of transition metal, and x varies depending upon the battery charged/discharged state and is usually $0.05 \leq x \leq 1.20$) such as $LiCoO_2$, $LiNiO_2$, $LiMn_2O_4$ or $LiMnO_2$ may be mentioned.

Further, a composite oxide having part of a transition metal atom mainly constituting the lithium/transition metal composite oxide substituted with other metal such as Al, Ti, V, Cr, Mn, Fe, Co, Li, Ni, Cu, Zn, Mg, Ga, Zr, Si or Yb, chalcogenide of a transition element such as $FeS_2$, $TiS_2$, $V_2O_5$, $MoO_3$ or $MoS_2$, or a polymer such as polyacetylene or polypyrrole may be used. Particularly, a lithium/transition metal composite oxide capable of doping and undoping Li and a metal composite oxide material having part of a transition metal atom substituted are preferred.

Further, such a cathode active material having a material differing in the composition from the material constituting the cathode active material as the main body, attached to the surface, may also be used. As the material attached to the surface, oxides such as aluminum oxide, silicon oxide, titanium oxide, zirconium oxide, magnesium oxide, calcium oxide, boron oxide, antimony oxide and bismuth oxide; sulfates such as lithium sulfate, sodium sulfate, potassium sulfate, magnesium sulfate, calcium sulfate and aluminum sulfate; and carbonates such as lithium carbonate, calcium carbonate and magnesium carbonate may, for example, be mentioned.

The positive electrode commonly has a constitution such that a cathode active material is formed on a current collector such as an aluminum, titanium or stainless steel foil or an expanded metal. In order to improve adhesion of the cathode active material to the current corrector, a binder such as a polyvinylidene fluoride binder or a latex binder may be incorporated, and in order to improve electron conductivity in the positive electrode, carbon black, amorphous whisker, graphite or the like may be incorporated.

The separator is preferably a membrane which electrically insulates the positive electrode and the negative electrode and which has lithium ion permeability, and may, for example, be a porous membrane such as a microporous polymer film. The microporous polymer film is particularly preferably a porous polyolefin film, more specifically, preferably a porous polyethylene film, a porous polypropylene film or a multilayer film of a porous polyethylene film and a polypropylene film. Further, as the separator, a polymer electrolyte may be used. The polymer electrolyte may, for example, be a polymer substance having a lithium salt dissolved therein or a polymer substance swollen by an electrolytic solution, but is not limited thereto.

The non-aqueous electrolytic solution may be used for the purpose of swelling the polymer substance to obtain a polymer electrolyte, or may be infiltrated into a separator comprising a porous polyolefin film and a polymer electrolyte used in combination.

The shape of the lithium ion secondary battery using the non-aqueous electrolytic solution of the present invention is not particularly limited, and the battery may be formed into e.g. cylindrical, rectangular, laminate, coin or button batteries.

EXAMPLES

Now, the present invention will be described in further detail with reference to Examples. However, it should be understood that the present invention is by no means restricted thereto, and modifications are possible within the scope of the present invention.

Preparation of Battery

A flat wound electrode group having the following positive electrode and negative electrode wound via a separator (F23DHA, manufactured by Toray Battery Separator Film Co., Ltd.) having a thickness of 23 μm, was accommodated in a case to prepare a rectangular battery cell of 30 mm×30 mm×2.0 mm in thickness.

Positive electrode: to a positive electrode material obtained by mixing 5 mass % of polyvinylidene fluoride as a binder, 4 mass % of acetylene black as an electrically conductive material, and 91 mass % of $LiNi_{0.6}Mn_{0.2}Co_{0.2}O_2$ as a cathode active material which is a composite oxide powder of lithium, nickel, manganese and cobalt, N-methylpyrrolidone was added to prepare a paste, which was applied to both surfaces of an aluminum foil current collector having a thickness of 18 μm, the solvent was removed by drying, and the aluminum foil current collector was calendered by a roll press, whereby the positive electrode was prepared.

Negative electrode: 95.8 mass % of an artificial graphitized carbon powder, 2.0 mass % of a styrene butadiene rubber (SBR) as a binder and a carboxymethyl cellulose 2.2 mass % aqueous solution were mixed, and formed into a slurry with water as a dispersion medium, the slurry was applied on both sides of a copper foil having a thickness of 12 μm, the solvent was removed by drying, and the copper foil was calendered by a roll press, whereby the negative electrode was prepared.

Using the above prepared battery cell, a lithium ion secondary battery was prepared in the following procedure a to c.
 a. 0.55 g of an electrolytic solution was weighed and poured into an inlet of the battery cell, followed by decompression, and the inlet was sealed.
 b. The sealed battery cell was charged at 8 mA to 4.2 V and then discharged at 8 mA to 3.0 V in a 25° C. atmosphere.
 c. The gas inside the battery cell discharged to 3.0 V was removed under reduced pressure to prepare a battery.

Evaluation of Battery

Of the above prepared battery, charge and discharge properties were measured as follows.
a. Resistance Change Before the following high temperature cycle test, the battery was charged at 25° C. to SOC (state of charge) 50%, and discharged at 0.2C, 0.5C, 1.0C or 2.0C in each environment for 10 seconds to obtain an initial direct current resistance.

The battery was charged in a 45° C. atmosphere at 1C rate to 4.2 V and then discharged in the same atmosphere at 1C rate to 3.0 V, and such a cycle was repeated 200 times, and then a direct current resistance after cycles was obtained under the same conditions as before the high temperature cycle test. From the initial direct current resistance and the direct current resistance after cycles, the resistance change (%) was obtained in accordance with the following formula (1).

Resistance change=(resistance after cycles/initial resistance)×100 (1)

b. Capacity Retention

The battery was charged in a 45° C. atmosphere at 1C rate to 4.2 V and then discharged in the same atmosphere at 10 rate to 3.0V, and the discharge capacity was taken as the initial capacity. Such a cycle was repeated 200 times under the same conditions. From the initial capacity and the capacity after cycles, the capacity retention (%) was obtained in accordance with the following formula (2).

Capacity retention=(capacity after cycles/initial capacity)×100 (2)

Examples A Series

Production Example 1

In an argon atmosphere, into a 500 ml Erlenmeyer flask, 100 ml of methanol was put, 30 g of lithium oxide was added, and the mixed liquid was cooled to 10° C. with stirring. While the mixed liquid was kept at 10° C., 290 g boron trifluoride methanol complex was added with stirring over a period of 5 hours, and the reaction liquid was kept at 50° C. and stirred for 3 hours.

Then, the reaction liquid was concentrated, and methanol was removed to obtain crude lithium oxide/$2BF_3$ complex. The obtained crude lithium oxide/$2BF_3$ complex was washed three times each with 50 ml of dibutyl ether to remove excess boron trifluoride methanol complex. The obtained solid was vacuum dried in a 110° C. atmosphere for 10 hours to obtain 157 g of O—$(BF_3Li)_2$ as lithium oxide/$2BF_3$ complex.

The obtained solid was analyzed by ICP, whereupon the proportion of boron element was 99.5 per 100 lithium.

Production Example 2

91 g of (O—$(BF_3Li)(Li)$) as lithium oxide/$BF_3$ complex was obtained in the same manner as in Example 1 except that 132 g of boron trifluoride methanol complex was used instead of 290 g of boron trifluoride methanol complex.

The obtained solid was analyzed by ICP, whereupon the proportion of boron element was 48 per 100 lithium.

Production Example 3

30 In an argon atmosphere, into a 500 ml Erlenmeyer flask, 100 ml of methanol was put, 23 g of lithium sulfide was added, and the mixed liquid was cooled to 10° C. with stirring.

While the mixed liquid was kept at 10° C., 155 g of boron trifluoride diethyl ether complex was added over a period of 5 hours, and the reaction liquid was kept at 50° C. and stirred for 3 hours.

Then, diethyl ether was removed from the reaction liquid to obtain crude lithium sulfide/$2BF_3$ complex. The obtained crude lithium sulfide/$2BF_3$ complex was washed three times each with 50 ml of dibutyl ether. The obtained solid was vacuum dried in a 110° C. atmosphere for 10 hours to obtain 87 g of (S—$(BF_3Li)_2$) as lithium sulfide/$2BF_3$ complex. The obtained solid was analyzed by ICP, whereupon the proportion of boron element was 99.8 per 100 lithium.

Production Example 4

53 g of (S—$(BF_3Li)(Li)$) as lithium sulfide/$BF_3$ complex was obtained in the same manner as in Production Example 3 except that in an argon atmosphere, 76 g of boron trifluoride diethyl ether complex was used instead of 155 g of boron trifluoride diethyl ether complex.

The obtained solid was analyzed by ICP, whereupon the proportion of boron element was 51 per 100 lithium.

Production Example 5

Into a 300 ml beaker, 50 ml of methanol and 44 g of boron trifluoride methanol complex were put to prepare a mixed liquid.

Then, in an argon atmosphere, while the mixed liquid was kept at 10° C., 3.4 g of lithium nitride was added with stirring over a period of 5 hours.

Then, the reaction liquid was concentrated, and methanol was removed to obtain crude lithium nitride/$3BF_3$ complex. The obtained crude lithium nitride/$3BF_3$ complex was washed three times each with 20 ml of dibutyl ether. The obtained solid was vacuum dried in a 110° C. atmosphere for 10 hours to obtain 18 g of (N—$(BF_3Li)_3$) as lithium nitride/$3BF_3$ complex. The obtained solid was analyzed by ICP, whereupon the proportion of boron element was 98.5 per 100 lithium.

Production Example 6

14.5 g of (N—$(BF_3Li)2(Li)$) as lithium nitride/$2BF_3$ complex was obtained in the same manner as in Production Example 5 except that 29.5 g of boron trifluoride methanol complex was used instead of 44 g of boron trifluoride methanol complex.

The obtained solid was analyzed by ICP, whereupon the proportion of boron element was 68 per 100 lithium.

Production Example 7

Into a 300 ml beaker, 50 ml of methanol and 44 g of boron trifluoride methanol complex were put to prepare a mixed liquid.

Then, in an argon atmosphere, while the mixed liquid was kept at 10° C., and 5.2 g of trilithium phosphide was added with stirring over a period of 5 hours. Then, the reaction liquid was concentrated, and methanol was removed to obtain crude lithium phosphide/$3BF_3$ complex. The obtained crude lithium phosphide/$3BF_3$ complex was washed three times each with 20 ml of dibutyl ether. The obtained solid was vacuum dried in a 110° C. atmosphere for 10 hours to obtain 19 g of (P—$(BF_3Li)_3$) as lithium phosphide/$3BF_3$ complex. The obtained solid was analyzed by ICP, whereupon the proportion of boron element was 90 per 100 lithium.

Production Example 9

In an argon atmosphere, into a 300 ml Erlenmeyer flask, 50 ml of methanol was put, and 27 g lithium metasilicate was added, and the mixed liquid was cooled to 10° C. with stirring.

Then, while the mixed liquid was kept at 10° C., 86 g of boron trifluoride methanol complex was added over a period of 5 hours, and the reaction liquid was kept at 50° C. and stirred for 3 hours.

Then, methanol was removed from the reaction liquid to obtain crude lithium metasilicate/$2BF_3$ complex. The crude lithium metasilicate/$2BF_3$ complex was washed three times each with 50 ml of dibutyl ether. The obtained solid was vacuum dried in a 110° C. atmosphere for 10 hours to obtain 62 g ($SiO_3$—$(BF_3Li)_2$) as lithium metasilicate/$2BF_3$ complex. The obtained solid was analyzed by ICP, whereupon the proportion of boron element was 99.5 per 100 lithium.

Production Example 10

14.5 g (($SiO_3$—$(BF_3Li)(Li)$) as lithium metasilicate/$2BF_3$ complex was obtained in the same manner as in Production Example 9 except that 43 g of boron trifluoride methanol complex was used instead of 86 g of boron trifluoride methanol complex.

The obtained solid was analyzed by ICP, whereupon the proportion of boron element was 49 per 100 lithium.

Examples 1 to 4

Into a mixed solvent of ethylene carbonate (EC), diethyl carbonate (DEC) and vinylene carbonate (VC) (volume ratio of 30:68:2), O—$(BF_3Li)_2$ or S—$(BF_3Li)_2$ as the electrolyte was added, whereupon it was favorably dissolved, whereby the electrolytic solutions to be used in Examples 1 to 4, as identified in Table 1 were prepared.

Using each of the above prepared electrolytic solutions, in accordance with the above battery preparation procedure, batteries in Examples 1 to 4 were prepared, and the resistance change and the capacity retention were obtained. The results are shown in Table 1.

TABLE 1

| Example | Electrolyte | Addition amount (mol/l) | Capacity retention (%) | Resistance change (%) |
| --- | --- | --- | --- | --- |
| 1 | O—$(BF_3Li)_2$ | 0.5 | 84 | 135 |
| 2 | O—$(BF_3Li)_2$ | 1.0 | 86 | 134 |
| 3 | S—$(BF_3Li)_2$ | 0.5 | 85 | 125 |
| 4 | S—$(BF_3Li)_2$ | 1.0 | 83 | 123 |

As shown in Table 1, the batteris in Examples 1 to 4 maintained high cycle capacity retention and had an effect to keep the resistance change to be low.

Examples 5 to 8, Comparative Example 1

In a mixed solvent of ethylene carbonate (EC) and diethyl carbonate (DEC) (volume ratio of 30:70), $LiPF_6$ as a lithium salt was dissolved at a concentration of 1 mol/l to prepare standard electrolytic solution 1.

Then, to the standard electrolytic solution 1, O—$(BF_3Li)_2$ was added in amounts as identified in Table 2 to prepare electrolytic solutions. The addition amount (%) in Table 2 is mass % of the electrolyte added to the total mass (100 mass %) of the standard electrolytic solution 1 and the electrolyte.

Using each of the above prepared electrolytic solutions, in accordance with the above battery preparation procedure, laminate batteries in Examples 5 to 8 were prepared, and the resistance change and the capacity retention were obtained. The results are shown in Table 2.

TABLE 2

| Example | Addition amount (%) | Capacity retention (%) | Resistance change (%) |
| --- | --- | --- | --- |
| 5 | 0.5 | 86 | 140 |
| 6 | 1.0 | 88 | 135 |
| 7 | 2.0 | 87 | 134 |
| 8 | 3.0 | 86 | 135 |

As shown in Table 2, by adding a lithium compound and boron trifluoride complex, the resistance change at high temperature cycles was remarkably reduced, and an effect to improve the capacity retention after cycles was obtained.

Examples 9 to 17, Comparative Example 2

In a mixed solvent of ethylene carbonate (EC), diethyl carbonate (DEC) and fluoroethylene carbonate (FEC) (volume ratio of 30:67:3), $LiPF_6$ as a lithium salt was added at a concentration of 1 mol/l and dissolved to prepare standard electrolytic solution 2.

Then, to the standard electrolytic solution 2, an electrolyte as identified in Table 3 was added in amounts as identified in Table 3 to prepare electrolytic solutions. The addition amount (%) in Table 3 is mass % of the electrolyte added to the total mass (100 mass %) of the standard electrolytic solution 1 and the electrolyte.

Laminate batteries in Examples 9 to 17 and Comparative Example 2 as identified in Table 3 were prepared and the resistance change and the capacity retention were obtained. The results are shown in Table 3.

TABLE 3

| Example | Electrolyte | Addition amount (%) | Capacity retention (%) | Resistance change (%) |
|---|---|---|---|---|
| 9 | O—(BF$_3$Li)(Li) | 0.5 | 90 | 136 |
| 10 | O—(BF$_3$Li)$_2$ | 0.5 | 89 | 134 |
| 11 | S—(BF$_3$Li)(Li) | 0.5 | 90 | 129 |
| 12 | S—(BF$_3$Li)$_2$ | 0.5 | 90 | 128 |
| 13 | N—(BF$_3$Li)$_3$ | 0.5 | 87 | 148 |
| 14 | N—(BF$_3$Li)$_2$(Li) | 0.5 | 88 | 145 |
| 15 | P—(BF$_3$Li)$_3$ | 0.5 | 89 | 137 |
| 16 | SiO$_3$—(BF$_3$Li)$_2$ | 0.5 | 91 | 127 |
| 17 | SiO$_3$—(BF$_3$Li)(Li) | 0.5 | 90 | 125 |
| Comp. Ex. 2 | Nil | — | 85 | 198 |

As shown in Table 3, by adding the lithium-containing complex compound, the resistance change at high temperature cycles was remarkably decreased, and particularly in Examples 7, 8, 12 and 13, the improvement was significant.

Further, an effect to improve the capacity retention after cycles is obtained. Particularly, with the compound A having O, S, Si elements, the capacity retention can be remarkably improved.

Examples 18 to 17

Into a mixed solvent of ethylene carbonate (EC) and diethyl carbonate (DEC) (volume ratio of 30:70), LiPF$_6$ as a lithium salt was added at a concentration of 1 mol/l and dissolved to prepare standard electrolytic solution 3.

Then, to the standard electrolytic solution 3, S—(BF$_3$Li)$_2$ was added in an amount of 0.3 mass % and further additives as identified in Table 4 were added in amounts (%) as identified in Table 4 to prepare electrolytic solutions in Examples 18 to 21. In the electrolytic solution in Comparative Example 3, no S—(BF$_3$Li)$_2$ was added. The addition amount is mass % to the total mass (100 mass %) of the standard electrolytic solution 3, S—(BF$_3$Li)$_2$ and the additive.

Using the electrolytic solutions 14 to 17 and the standard electrolytic solution 3 as identified in Table 4, in accordance with the above battery preparation procedure, laminate batteries in Examples 14 to 17 and Comparative Example 3 were prepared, and the resistance change and the capacity retention were obtained. The results are shown in Table 4.

TABLE 4

| Example | Additive (addition amount: %) | Capacity retention (%) | Resistance change (%) |
|---|---|---|---|
| 18 | Vinylene carbonate (1.0) | 88 | 134 |
| 19 | 1,3-Propanesultone (1.0) | 89 | 129 |
| 20 | Maleic anhydride (0.5) | 91 | 132 |
| 21 | Ethylene methanedisulfonate (1.0) | 91 | 108 |
| Comp. Ex. 3 | Vinylene carbonate (1.0) | 86 | 186 |

As shown in Table 4, by adding the lihtium compound A and the boron trifluoride complex, the capacity retention at high temperature cycles is remarkably improved, and an effect to remarkably decrease the resistance change after cycles is obtained.

Examples B Series

Production Example 1

Into a 200 ml beaker, 50 ml of deionized water was put, 6.2 g of boric acid was added, and the mixed liquid was heated to 60° C. with stirring. While the mixed liquid was kept at 60° C., 72 g of 10 mass % lithium hydroxide was added with stirring, and further, the mixed liquid was stirred for 12 hours while being kept at 60° C.

Then, the reaction liquid was concentrated to dryness, the residue was vacuum-dried in a 200° C. atmosphere for 12 hours and ground to obtain white powdery trilithium borate.

And, in an argon atmosphere, into a 100 ml Erlenmeyer flask, the white powdery trilithium borate and 30 ml of diethyl ether were put, and the mixed liquid was cooled to 10° C. with stirring. Then, while the mixed liquid was kept at 20° C., 45 g of boron trifluoride diethyl ether complex was added with stirring over a period of 3 hours, and the reaction liquid was kept at 50° C. and stirred for 3 hours.

Then, diethyl ether was removed to obtain crude B—(OBF$_3$Li)$_3$ complex. The obtained crude product was washed three times with 10 ml of dibutyl ether to remove excess boron trifluoride diethyl ether complex. The obtained solid was vacuum dried in a 110° C. environment for 10 hours to obtain B—(OBF$_3$Li)$_3$ as lithium borate/3BF$_3$ complex.

The obtained solid was analyzed by ICP, whereupon the proportion of lithium atoms to boron atoms was 3:4.

Production Example 2

LiBO—(OBF$_3$Li)$_2$ as Lithium borate/2BF$_3$ complex was obtained in the same manner as in Production Example 1, except that 29 g of boron trifluoride diethyl ether complex was used instead of 45 g of boron trifluoride diethyl ether complex.

The obtained solid was analyzed by ICP, whereupon the proportion of lithium atoms to boron atoms was 1:1

Production Example 3

White powdery dilithium borate was obtained in the same manner as in Production Example 1, except that 50 g of 10 mass % lithium hydroxide was used instead of 72 g of 10 mass % lithium hydroxide.

B$_2$O—(OBF$_3$Li)$_4$ as dilithium borate/2BF$_3$ complex was obtained in the same manner as in Production Example 1 except that 29 g of boron trifluoride diethyl ether complex was used instead of 45 g of boron trifluoride diethyl ether complex.

The obtained solid was analyzed by ICP, whereupon the proportion of lithium atoms to boron atoms was 2:3.

Production Example 4

Into a 300 ml beaker, 100 ml of deionized water was put, 31 g of boric acid was added, and the mixed liquid was heated to 60° C. with stirring. Then, while the mixed liquid was kept at 60° C., 30 g of 10 mass % lithium hydroxide was added with stirring, and further the mixed liquid was stirred for 12 hours while being kept at 60° C. Then, the reaction liquid was concentrated to dryness, and the residue was vacuum-dried in a 200° C. atmosphere for 12 hours and ground to obtain a white powder.

And, in an argon atmosphere, into a 300 ml Erlenmeyer flask, the obtained white powder and 50 ml of diethyl ether were put, and the mixed liquid was cooled to 10° C. with stirring. While the mixed liquid was kept at 20° C., 16 g of boron trifluoride diethyl ether complex was added with stirring over a period of 3 hours, and the reaction liquid was kept at 50° C. and stirred for 3 hours.

Then, diethyl ether was removed to obtain crude $B_5O_7$—($OBF_3Li$) complex. The obtained crude complex was washed three times with 50 ml of dibutyl ether to remove excess boron trifluoride diethyl ether complex. The obtained solid was vacuum dried in a 110° C. atmosphere for 10 hours to obtain $B_5O_7$—($OBF_3Li$) complex.

The obtained solid was analyzed by ICP, whereupon the proportion of lithium atoms to boron atoms was 1:6.

Production Example 5

Into a 200 ml beaker, 50 ml of deionized water was put, 6.2 g of boric acid was added, the mixed liquid was kept at 25° C., and 22.8 g of trifluoroacetic acid was slowly added with stirring, and the mixed liquid was stirred for 12 hours while being kept at 60° C.

And, while the reaction liquid was kept at 25° C., 24 g of 10 mass % lithium hydroxide was added, and further the reaction liquid was stirred for 12 hours while being kept at 60° C. Then, the reaction liquid was concentrated to dryness, and the residue was vacuum-dried in a 120° C. atmosphere for 6 hours and ground to obtain a white powder.

And, in an argon atmosphere, into a 200 ml Erlenmeyer flask, the obtained white powder and 50 ml of diethyl ether were put, and the mixed liquid was cooled to 10° C. with stirring. Then, while the mixed liquid was kept at 20° C., 16 g of boron trifluoride diethyl ether complex was added with stirring over a period of 3 hours, and the reaction liquid was stirred for 3 hours while being kept at 50° C.

Then, diethyl ether was removed to obtain crude $B(OC(=O)CF_3)_2(OBF_3Li)$ complex. The obtained crude product was washed three times with 50 ml of dibutyl ether to remove excess boron trifluoride diethyl ether complex. The obtained solid was vacuum-dried in a 110° C. atmosphere for 10 hours to obtain $B(OC(=O)CF_3)_2(OBF_3Li)$ complex.

The obtained solid was analyzed by ICP, whereupon the proportion of lithium atoms to boron atoms was 1:2.

Production Examples 6 to 8

$B(OOC—COO)(OBF_3Li)$ complex (Production Example 6), $B(OOCCH_2COO)(OBF_3Li)$ complex (Production Example 7) and $B(OOCCH_2SCH_2COO)(OBF_3Li)$ complex (Production Example 8) were obtained in the same manner as in Production Example 1 except that 9 g of oxalic acid (Production Example 6), 10.4 g of malonic acid (Production Example 7), and 15 g of thiodiacetic acid (Production Example 8) were used instead of 22.8 g trifluoroacetic acid.

The obtained solid was analyzed by ICP, whereupon the proportion of lithium atoms to boron atoms was 1:2.

Examples 1 to 6

Into a mixed solvent of ethylene carbonate (EC), dimethyl carbonate (DMC), diethyl carbonate (DEC) and vinylene carbonate (VC) (volume ratio of 30:30:38:2), the electrolytes as identified in Table 5 were added in amounts as identified in Table 5 to prepare electrolytic solutions to be used in Examples 1 to 4 as identified in Table 5. The addition amounts of the electrolyte in Table 5 are mol/L based on lithium.

Using each of the above prepared electrolytic solutions, in accordance with the above battery preparation procedure, batteries in Examples 1 to 6 were prepared, and the resistance change and the capacity retention were obtained. The results are shown in Table 5.

TABLE 5

| Example | Electrolyte | Addition amount (mol/l) | Capacity retention (%) | Resistance change (%) |
|---|---|---|---|---|
| 1 | B—(OBF$_3$Li)$_3$ | 1.0 | 84 | 135 |
| 2 | B—(OBF$_3$Li)$_3$ | 1.5 | 86 | 134 |
| 3 | B—(OBF$_3$Li)$_3$ | 2.0 | 85 | 125 |
| 4 | LiBO—(OBF$_3$Li)$_2$ | 1.0 | 86 | 134 |
| 5 | B2O—(OBF$_3$Li)$_4$ | 1.0 | 85 | 125 |
| 6 | B(OC(=O)CF$_3$)$_2$(OBF$_3$Li) | 1.0 | 83 | 123 |

As shown in Table 5, the batteries in Examples 1 to 6 maintained high cycle capacity retention and had an effect to suppress the resistance change to be low.

Examples 7 to 19

To 99 g of a solution having LiPF$_6$ as a lithium salt dissolved at a concentration of 1 mol/L in a mixed solvent of ethylene carbonate (EC) and diethyl carbonate (DEC) (volume ratio of 30:70), and 1 g of vinylene carbonate was added to prepare standard electrolytic solution 1.

Then, into the standard electrolytic solution 1, the lithium-containing boron complex compounds as identified in Table 6 were added in amounts as identified in Table 6, to prepare electrolytic solutions to be used in Examples 7 to 20 and Comparative Example 1. The addition amounts (%) in Table 6 were mass % to the total mass (100 mass %) of the standard electrolytic solution 1 and the compound.

Using each of the above prepared electrolytic solutions, in accordance with the above battery preparation procedure, batteries in Examples 7 to 20 and Comparative Example 1 were prepared, and the resistance change and the capacity retention were obtained, in accordance with the above resistance change and capacity retention evaluating procedure. The results are shown in Table 6.

TABLE 6

| Example | Lithium-containing boron complex compound | Addition amount (%) | Capacity retention (%) | Resistance change (%) |
|---|---|---|---|---|
| 7 | B—(OBF$_3$OBF$_3$Li)$_3$ | 0.5 | 89 | 129 |
| 8 | B—(OBF$_3$Li)$_3$ | 1.0 | 89 | 124 |
| 9 | B—(OBF$_3$Li)$_3$ | 2.0 | 87 | 124 |
| 10 | LiBO—(OBF$_3$Li)$_2$ | 0.5 | 89 | 128 |
| 11 | B$_2$O—(OBF$_3$Li)$_4$ | 0.5 | 89 | 131 |
| 12 | B$_5$O$_7$—(OBF$_3$Li) | 0.5 | 88 | 125 |
| 13 | B(OC(=O)CF$_3$)$_2$(OBF$_3$Li) | 0.5 | 89 | 125 |
| 14 | B(OOC—COO)(OBF$_3$Li) | 0.5 | 90 | 128 |
| 15 | B(OOCCH$_2$COO)(OBF$_3$Li) | 0.5 | 89 | 137 |
| 16 | B(OOCCH$_2$SCH$_2$COO)(OBF$_3$Li) | 0.5 | 91 | 124 |
| 17 | Li$_3$B(OPF$_5$)$_3$ | 0.5 | 90 | 127 |
| 18 | Li$_2$OB$_2$(OOCCOO)$_2$(OBF$_3$)$_2$ | 0.5 | 90 | 134 |
| 19 | LiB(OOCCH$_2$COO)(OBF$_3$) | 0.3 | 89 | 131 |
| 20 | LiB(OOCCH$_2$COO)(OBF$_3$) | 1.0 | 88 | 123 |
| Comp. Ex. 1 | — | | 86 | 182 |

As shown in Table 6, by adding the lithium-containing boron complex compound, the resistance change at high temperature cycles was remarkably decreased. Further, an effect to improve the capacity retention after cycles is obtained.

Examples 21 to 24

Into a mixed solvent of ethylene carbonate (EC) and diethyl carbonate (DEC) (volume ratio of 30:70), LiPF$_6$ as a lithium salt was added at a concentration of 1 mol/l and dissolved to prepare standard electrolytic solution 2.

Then, to the standard electrolytic solution 2, B—(OBF$_3$Li)$_3$ was added in an addition amount of 0.5 mass %, and further, additives as identified in Table 7 were added in addition amounts (%) as identified in Table 7, to prepare electrolytic solutions 20 to 23. In the electrolytic solution in Comparative Example 2, no B—(OBF$_3$Li)$_3$ was added. The addition amounts were mass % to the total mass (100 mass %) of the standard electrolytic solution 2, B—(OBF$_3$Li)$_3$ and the additive.

Using the electrolytic solutions 21 to 24 and the standard electrolytic solution 2 as identified in Table 7, in accordance with the above battery preparation procedure, batteries in Examples 21 to 24 and Comparative Example 2 were prepared, and the resistance change and the capacity retention were obtained. The results are shown in Table 7.

TABLE 7

| Example | Additive (addition amount: %) | Capacity retention (%) | Resistance change (%) |
|---|---|---|---|
| 21 | Vinylene carbonate (1.0) | 89 | 129 |
| 22 | 1,3-Propanesultone (1.0) | 90 | 127 |
| 23 | Maleic anhydride (0.5) | 90 | 135 |
| 24 | Ethylene methanedisulfonate (1.0) | 91 | 115 |
| Comp. Ex. 2 | Vinylene carbonate (1.0) | 86 | 186 |

As shown in Table 7, by adding the lithium-containing boron complex compound, the capacity retention at high temperature cycles can be improved, and the resistance change after cycles was remarkably reduced.

INDUSTRIAL APPLICABILITY

Non-aqueous electrolyte and solid-state lithium secondary batteries using the electrolyte for a storage device of the present invention, are widely used for storage devices, e.g. power sources for consumer equipment such as mobile phones and notebook computers, power sources for industrial equipment, storage batteries and power sources for automobile.

The invention claimed is:

1. An electrolytic solution for a storage device, which comprises a solvent and a lithium-containing complex compound represented by the following formula (1), (2), (3), (4) or (5):

$$(Li)_m(A)_n(UF_x)_y \quad (1)$$

$$(Li)_m(Si)_n(O)_q(UF_x)_y \quad (2)$$

wherein A is O, S, P or N; U is a boron atom or a phosphorus atom; m and n are each independently from 1 to 6; q is from 1 to 12; x is 3 or 5; and y is from 1 to 6;

$$(Li)_m(O)_n(B)_p(OWF_q)_x \quad (3)$$

wherein W is a boron atom or a phosphorus atom; m, p and x are each independently from 1 to 15; n is from 0 to 15; and q is 3 or 5;

$$(Li)_m(B)_p(O)n(OR)_y(OWF_q)_x \quad (4)$$

wherein W is a boron atom or a phosphorus atom; n is from 0 to 15; p, m, x and y are each independently from 1 to 12; q is 3 or 5; and R is hydrogen, an alkyl group, an alkenyl group, an aryl group, a carbonyl group, a sulfonyl group or a silyl group, and such a group may have a fluorine atom, an oxygen atom or other substituent;

$$(Li)_m(O)_n(B)_p(OOC-(A)_z-COO)_y(OWF_q)_x \quad (5)$$

wherein W is a boron atom or a phosphorus atom, A is a C$_{1-6}$ allylene group, alkenylene group or alkynylene group, a phenylene group, or an alkylene group having an oxygen atom or a sulfur atom in its main chain; m, p, x and y are each independently from 1 to 20; n is from 0 to 15; z is 0 or 1; and q is 3 or 5.

2. The electrolytic solution according to claim 1, wherein the solvent comprises at least one solvent selected from the group consisting of a cyclic carbonate, a chain carbonate, a lactone, a nitrile compound, a sulfone compound, a cyclic carboxylic acid ester, a chain carboxylic acid ester, a cyclic ether, a chain ether, a chain glycol ether and a fluorinated ether.

3. The electrolytic solution according to claim 1, wherein the solvent is an unsaturated compound.

4. The electrolytic solution according to claim 1, wherein the solvent is a fluorinated compound.

5. The electrolytic solution according to claim 1, wherein the lithium-containing complex compound is contained in an amount of from 0.01 to 30 parts by mass per 100 parts by mass of the solvent.

6. The electrolytic solution according to claim 1, which further comprises a lithium salt.

7. The electrolytic solution according to claim 6, wherein the lithium salt is at least one lithium salt selected from the group consisting of an inorganic fluoride, an organic sulfonate, a fluoroalkylsulfonic acid imide salt, and a fluorinated organic lithium salt.

8. The electrolytic solution according to claim 6, wherein the lithium salt is at least one lithium salt selected from the group consisting of $LiPF_6$, $LiBF_4$, $LiCF_3SO_3$, $LiN(FSO_2)_2$, $LiN(CF_3SO_2)_2$, $LiN(C_2F_5SO_2)_2$, $LiN(CF_3SO_2)(C_2F_5SO_2)$ and $LiN(CF_3SO_2)(C_4F_9SO_2)$.

9. The electrolytic solution according to claim 1, which further comprises at least one additive selected from the group consisting of a sulfur-containing compound, a cyclic acid anhydride, a carboxylic acid compound, a silicon-containing compound and a boron-containing compound.

10. The electrolytic solution according to claim 6, which further comprises at least one additive selected from the group consisting of a sulfur-containing compound, a cyclic acid anhydride, a carboxylic acid compound, a silicon-containing compound and a boron-containing compound.

11. A storage device using the electrolytic solution as defined in claim 1.

12. The storage device according to claim 11, which is a lithium ion secondary battery.

\* \* \* \* \*